(12) United States Patent
Kauz

(10) Patent No.: US 11,932,220 B2
(45) Date of Patent: Mar. 19, 2024

(54) PASSIVE FORCE EMULATOR PEDAL ASSEMBLY

(71) Applicant: KSR IP Holdings, LLC, Wilmington, DE (US)

(72) Inventor: Wjatscheslaw Kauz, Pattensen (DE)

(73) Assignee: KSR IP Holdings, LLC, Wilmington, DE (US)

(*) Notice: Subject to any disclaimer, the term of this patent is extended or adjusted under 35 U.S.C. 154(b) by 0 days.

(21) Appl. No.: 17/989,911

(22) Filed: Nov. 18, 2022

(65) Prior Publication Data

US 2023/0159008 A1 May 25, 2023

Related U.S. Application Data

(60) Provisional application No. 63/281,379, filed on Nov. 19, 2021.

(51) Int. Cl.
*B60T 7/04* (2006.01)
*G05G 5/03* (2008.04)

(52) U.S. Cl.
CPC ............. *B60T 7/042* (2013.01); *G05G 5/03* (2013.01); *B60T 2220/04* (2013.01)

(58) Field of Classification Search
CPC .. G05G 1/30; G05G 1/38; G05G 1/44; G05G 1/445; G05G 5/03; G05G 5/05; B60K 26/02; B60K 26/021; B60K 2026/022; B60K 2026/023; B60T 7/04; B60T 7/042;
(Continued)

(56) References Cited

U.S. PATENT DOCUMENTS 6,666,106 B1 * 12/2003 Hueges ................. F16H 59/20
74/513
7,228,758 B2   6/2007 Fujiwara
7,503,235 B2   3/2009 Podkopayev
(Continued)

FOREIGN PATENT DOCUMENTS

CN    101077707 A    11/2007
CN    201566600 U     9/2010
(Continued)

OTHER PUBLICATIONS

Machine Translation of EP-3031653-A1.*
(Continued)

*Primary Examiner* — Daniel D Yabut
(74) *Attorney, Agent, or Firm* — Dinsmore & Shohl LLP

(57) ABSTRACT

A pedal assembly includes a housing, a spring arm member, a pedal arm, a spring carrier, and a spring guide member. The spring arm member is coupled to the housing. The pedal arm has a hub portion and an opposite pedal pad. The hub portion is pivotally retained in the housing by the spring arm member at the hub portion. The spring carrier is coupled to the pedal arm and to the spring arm member. The spring carrier has at least one spring positioned to provide a first pedal effort force to the pedal arm at a first amount of predetermined travel of the pedal arm. The spring guide member contacts a second at least one spring from the pedal arm when the pedal arm exceeds a second amount of predetermined travel of the pedal pad. The at least one spring provides a second pedal effort force.

20 Claims, 11 Drawing Sheets

(58) Field of Classification Search
CPC ........ B60T 7/06; B60T 2220/04; B60T 8/409; B60T 8/4086; B60T 8/4081; F16H 59/20
See application file for complete search history.

(56) References Cited

U.S. PATENT DOCUMENTS

| | | | |
|---|---|---|---|
| 8,746,095 B2 | 6/2014 | Isono | |
| 9,180,852 B2 | 9/2015 | Nomura et al. | |
| 9,446,745 B2* | 9/2016 | Elliott | B60T 7/042 |
| 9,958,293 B2* | 5/2018 | Elliott | G01D 5/20 |
| 10,401,896 B1* | 9/2019 | Kim | G05G 1/44 |
| 10,678,290 B2 | 6/2020 | Stuart et al. | |
| 11,292,338 B2 | 4/2022 | Burke et al. | |
| 2003/0025389 A1 | 2/2003 | Ersoy et al. | |
| 2009/0000418 A1 | 1/2009 | Kim et al. | |
| 2011/0185843 A1* | 8/2011 | Soltys | B60T 7/042 |
| | | | 74/560 |
| 2012/0143441 A1* | 6/2012 | Yamazaki | G05G 1/38 |
| | | | 701/36 |
| 2012/0221220 A1* | 8/2012 | Yamazaki | B60W 10/18 |
| | | | 701/70 |
| 2013/0087009 A1* | 4/2013 | Stewart | G05G 1/44 |
| | | | 74/560 |
| 2014/0352485 A1 | 12/2014 | Stewart et al. | |
| 2015/0001914 A1* | 1/2015 | Antao | B60W 10/196 |
| | | | 303/3 |
| 2015/0070003 A1* | 3/2015 | Elliott | G01D 11/245 |
| | | | 324/207.2 |
| 2017/0174189 A1 | 6/2017 | Richards et al. | |
| 2018/0135726 A1* | 5/2018 | Kita | F16F 15/085 |
| 2019/0018441 A1 | 1/2019 | Song et al. | |
| 2019/0278318 A1* | 9/2019 | Park | B60K 26/021 |
| 2021/0255657 A1* | 8/2021 | Miller | B60K 26/02 |
| 2022/0089135 A1 | 3/2022 | Austermeier et al. | |
| 2022/0379723 A1* | 12/2022 | Vyskocil | B60K 26/021 |
| 2022/0379852 A1* | 12/2022 | O'Neill | B60T 7/06 |

FOREIGN PATENT DOCUMENTS

| | | | | |
|---|---|---|---|---|
| CN | 107878194 A | 4/2018 | | |
| DE | 10-2017-102516 A1 | 8/2017 | | |
| DE | 10-2016-209829 A1 | 12/2017 | | |
| DE | 10-2017-207417 A1 | 12/2017 | | |
| DE | 10-2017-103208 A1 | 8/2018 | | |
| DE | 10-2017-129565 B3 | 6/2019 | | |
| EP | 3031653 A1 * | 6/2016 | ......... | B60K 26/021 |
| EP | 3151082 A1 | 4/2017 | | |
| JP | 2021084458 A | 6/2021 | | |
| KR | 2010/0032129 A | 3/2010 | | |
| SE | 1450869 A1 * | 1/2016 | ............... | G05G 5/03 |
| SE | 1551663 A1 * | 6/2017 | ......... | B60K 26/021 |
| WO | 2011/021094 A1 | 2/2011 | | |
| WO | 2013/186609 A1 | 12/2013 | | |

OTHER PUBLICATIONS

"Elastomer," Wikipedia Page, dated by Wayback Machine to Jun. 26, 2020, url:<https://web.archive.org/web/20200626031902/https://en.wikipedia.org/wiki/Elastomer>.*

International Search Report dated Mar. 15, 2023; International Application No. PCT/US2022/050357.

* cited by examiner

US 11,932,220 B2

PASSIVE FORCE EMULATOR PEDAL ASSEMBLY

CROSS-REFERENCE TO RELATED APPLICATIONS

This utility patent application claims priority benefit from U.S. provisional patent application Ser. No. 63/281,379, filed Nov. 19, 2021 and entitled "Passive Pedal Force Emulator Assembly", the entire contents of which is incorporated herein in its entirety.

TECHNICAL FIELD

The present specification generally relates to pedal assemblies for vehicles and, more specifically, to pedal assemblies providing a pedal effort hepatic feel to a user.

BACKGROUND

Many pedal systems are passive driven. For example, a brake-by-wire for a braking system may be passive driven. However, newer braking pedal systems are now an e-boost braking system where a boost of the braking system is provided by an electric motor to provide the braking system with an active force. As such, the need for mechanical braking by the operator is reducing and the need for system components to perform the braking on behalf of the operator is increasing. As such, there is a need for passive force emulator to provide a pedal effort haptic feel to the operator when a pedal is depressed.

SUMMARY

In one embodiment, a pedal assembly is provided. The pedal assembly includes a housing, a spring arm member, a pedal arm, a spring carrier, and a spring guide member. The spring arm member is coupled to the housing. The pedal arm has a hub portion and an opposite pedal pad. The hub portion is pivotally retained in the housing by the spring arm member at the hub portion. The spring carrier is coupled to the pedal arm and to the spring arm member. The spring carrier has at least one spring positioned to provide a first pedal effort force to the pedal arm at a first amount of predetermined travel of the pedal arm. The spring guide member has a contact surface and an opposite rear surface that contacts a second at least one spring positioned between the rear surface and the housing. The contact surface receives contact from the pedal arm when the pedal arm exceeds a second amount of predetermined travel of the pedal pad. The at least one spring provides a second pedal effort force. When the pedal pad is depressed to the first amount of predetermined travel of the pedal arm, the at least one spring of the spring carrier applies the first pedal effort force onto the pedal arm and when the pedal pad is further depressed to the second amount of predetermined travel of the pedal pad, the contact surface and the second at least one spring applies the second pedal effort force onto the pedal arm. The second pedal effort force is a greater pedal effort than the first pedal effort force.

In another embodiment, a pedal assembly for a vehicle is provided. The pedal assembly includes a housing, a spring arm member, a pedal arm, a spring carrier, and a spring guide assembly. The spring arm member is coupled to the housing. The pedal arm has a hub portion and an opposite pedal pad. The hub portion is pivotally retained in the housing by the spring arm member at the hub portion. The spring carrier is coupled to the pedal arm and to the spring arm member. The spring carrier has at least one spring positioned to provide a first pedal effort force to the pedal arm at a first amount of predetermined travel of the pedal arm. The spring guide assembly has a spring guide member and a second at least one spring extending in perpendicular direction with respect to the spring carrier. The spring guide member has a cam surface and an opposite rear surface. The second at least one spring is positioned between the rear surface and the housing. The cam surface is positioned to be in contact with the pedal arm. The second at least one spring provides a second pedal effort force at a second amount of predetermined travel of the pedal pad. When the pedal pad is depressed to the first amount of predetermined travel of the pedal arm, the at least one spring of the spring carrier applies the first pedal effort force onto the pedal arm and when the pedal pad is further depressed to the second amount of predetermined travel of the pedal pad, the cam surface and the second at least one spring applies the second pedal effort force onto the pedal arm. The second pedal effort force is a greater pedal effort than the first pedal effort force.

In yet another embodiment, a pedal assembly is provided. The pedal assembly includes a housing, a spring arm member, a pedal arm, a spring carrier, a spring guide member, and a contact member. The spring arm member is coupled to the housing. The pedal arm has a hub portion and an opposite pedal pad. The hub portion is pivotally retained in the housing by the spring arm member at the hub portion. The spring carrier is coupled to the pedal arm and to the spring arm member. The spring carrier has at least one spring positioned to provide a first pedal effort force to the pedal arm at a first amount of predetermined travel of the pedal arm. The spring guide member has a contact surface and an opposite rear surface that contacts a second at least one spring positioned between the rear surface and the housing. The spring guide member and the second at least one spring extends in a direction perpendicular to the spring carrier. The contact surface receives contact from the pedal arm when the pedal arm is at a second amount of predetermined travel of the pedal pad. The at least one spring provides a second pedal effort force. The contact member is coupled to the housing. The contact member makes contact with the pedal arm to provide a third pedal effort force when the pedal arm is at a third amount of predetermined travel of the pedal pad. When the pedal pad is depressed to the first amount of predetermined travel of the pedal arm, the at least one spring of the spring carrier applies the first pedal effort force onto the pedal arm and when the pedal pad is further depressed to the second amount of predetermined travel of the pedal pad. The contact surface of the spring guide member and the second at least one spring applies the second pedal effort force onto the pedal arm. The second pedal effort force is a greater pedal effort than the first pedal effort force, and the contact member applies the third pedal effort force onto the pedal arm. The third pedal effort force is a greater pedal effort than the second pedal effort force.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
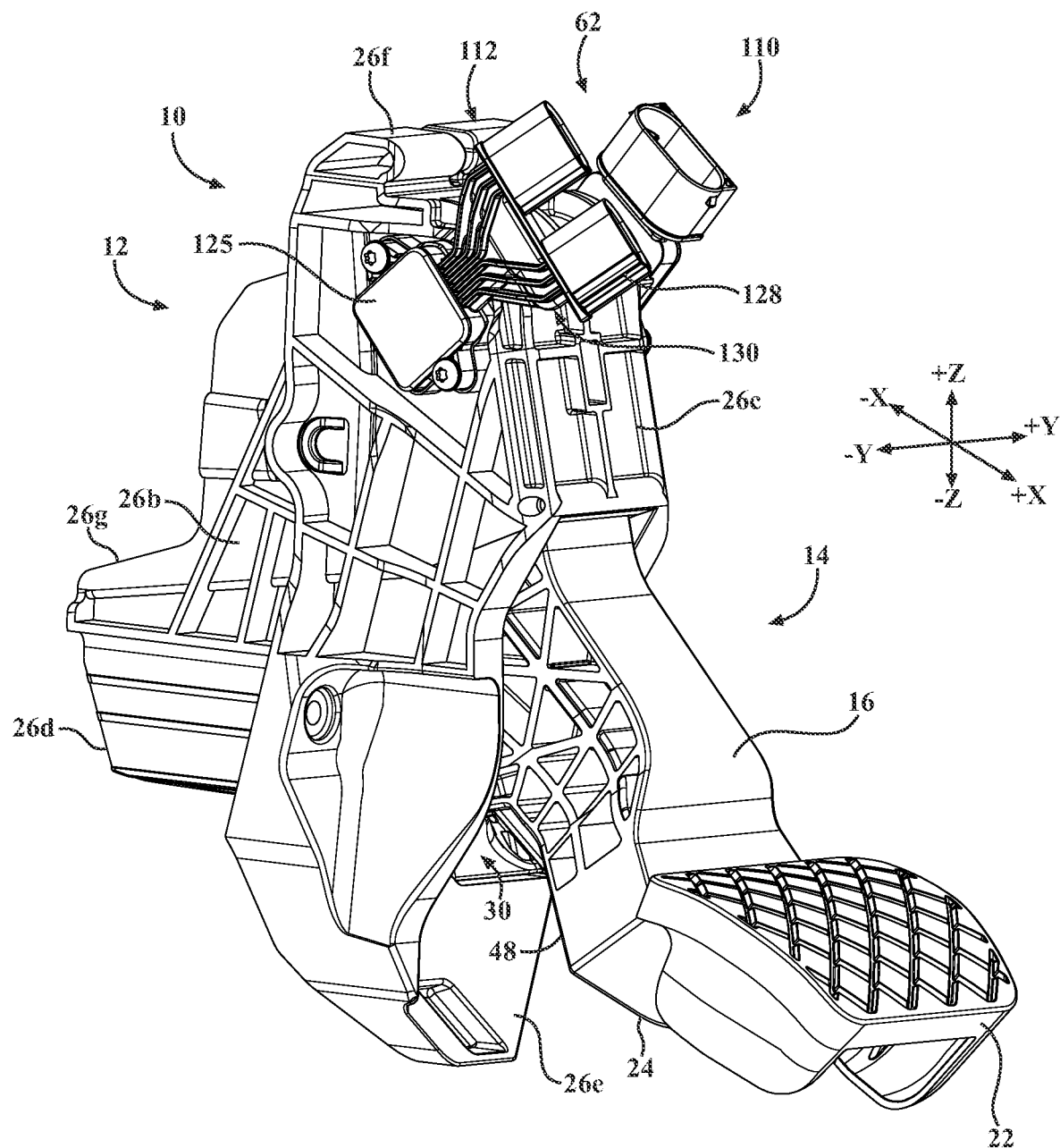
FIG. 1 schematically depicts a left side perspective view of a pedal assembly according to one or more embodiments shown and described herein.
Figure 2:
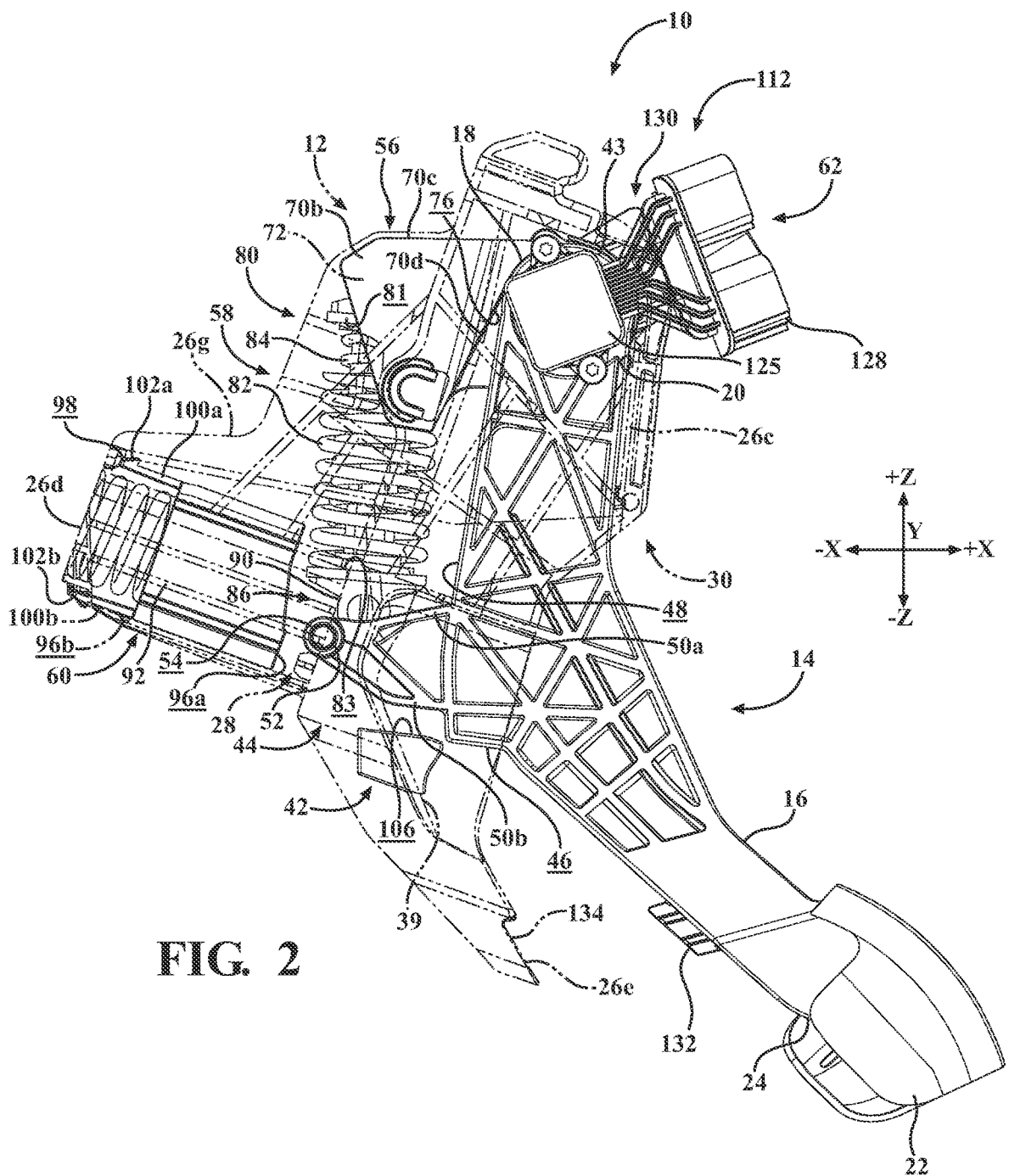
FIG. 2 schematically depicts a cross-sectional view of the pedal assembly of FIG. 1 taken from line 1-1 with a pedal arm in an undepressed state according to one or more embodiments shown and described herein.
Figure 3:
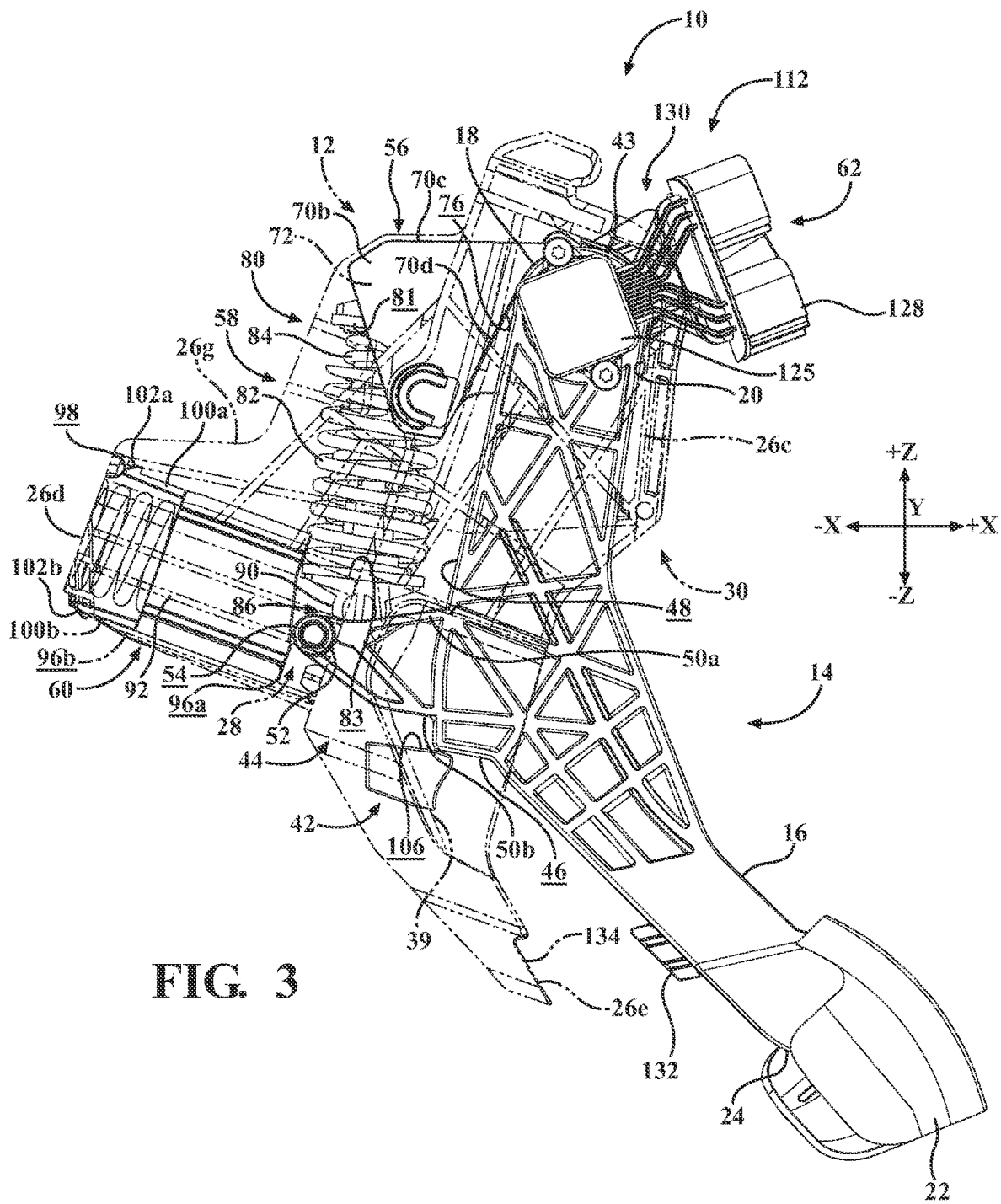
FIG. 3 schematically depicts a cross-sectional view of the pedal assembly of FIG. 1 taken from line 1-1 with the pedal arm in a partially depressed state according to one or more embodiments shown and described herein.
Figure 4:
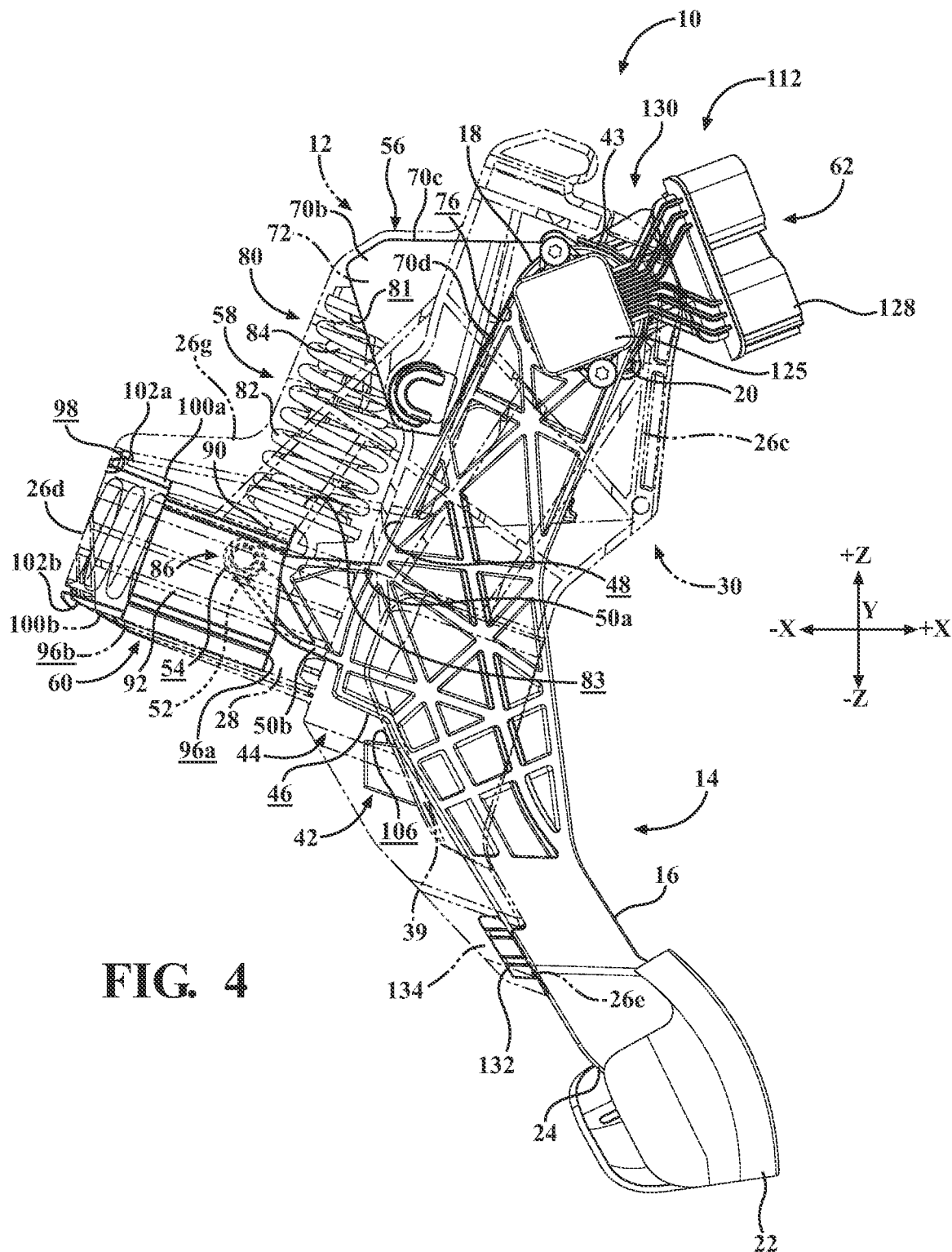
FIG. 4 schematically depicts a cross-sectional view of the pedal assembly of FIG. 1 taken from line 1-1 with the pedal arm in a fully depressed state according to one or more embodiments shown and described herein.

A brake pedal emulator (BPE) is a device that takes the place of a brake pedal and other hardware and is be used on an electromechanical braking system where there is no direct mechanical or hydraulic connection between the brake pedal and the calipers. The BPE inputs are force and travel distance from the driver's foot. Further inputs may include reference voltage for all sensors, ground for all sensors, and reaction loads at all fastening points. The BPE outputs are force feedback/resistance to driver's foot as a function of travel and speed. Multiple pedal position sensor outputs are a function of travel, and error codes relating to the sensor outputs. Optional function is the conditioning of the output signals to provide the driver's intended braking input signal. The intention is that the BPE behaves to the driver as closely as possible as a conventional braking system in terms of pedal feel and deceleration performance.

The BPE may be located in the passenger compartment in a driver's footwell area. The BPE needs to meet the same mechanical loads as conventional pedal assemblies and must behave in a similar way as the conventional pedal. For example, the BPE needs to behave similar to conventional pedals when respect to applying loads, lateral loads, reverse loads vs. deflections and plastic deformation.

Conventional brake pedal assemblies include a pedal mounting bracket with a pivotally attached pedal arm/lever that has certain pedal force characteristics that need to be met during the apply stroke of the pedal. As such, the BPE needs to be configured to meet these same certain pedal force characteristics. Further, in some embodiments, the BPE may also include a downstop for the brake pedal stroke. Additionally, the BPE needs to be configured to withstand panic braking loads.

The BPE assembly disclosed herein meets the following criteria: the BPE fails functional such that upon any failure, the driver is permitted to operate the braking system by applying the pedal and provide an appropriate sensor signal output; the BPE is configured to withstand foreseeable conditions and abuse a pedal will take; and the BPE is scalable to automotive volume series production and be cost effective to manufacture and assemble.

An example pedal assembly described herein includes three different components each configured to provide a different pedal effort force to a pedal arm as a function of travel of the pedal arm. For example, the example pedal assembly includes a housing that receives a spring arm member positioned within and coupled to the housing, a spring carrier coupled to the pedal arm, a spring guide member, and a contact member. A hub portion of the pedal arm pivotally engages with a portion of the spring arm member. The spring carrier is coupled to the pedal arm and to the spring arm member. At least one spring is positioned within the spring carrier to provide a first pedal effort force to the pedal arm at a first amount of predetermined travel of the pedal arm. The spring guide member has a cam surface and a second at least one spring. The cam surface is positioned to be in contact with the pedal arm along with the second at least one spring to provide a second pedal effort force at a second amount of predetermined travel of the pedal arm. The contact member is coupled to the housing and makes contact with the pedal arm to provide a third pedal effort force at a third amount of predetermined travel of the pedal arm.

As used herein, the term "communicatively coupled" means that coupled components are capable of exchanging data signals with one another such as, for example, electrical signals via conductive medium or a non-conductive medium, though networks such as via Wi-Fi, Bluetooth, and the like, electromagnetic signals via air, optical signals via optical waveguides, and the like.

As used herein, the term "longitudinal direction" refers to the forward-rearward direction of the assembly (i.e., in the +/−X-direction depicted in FIG. 1). The term "lateral direction" refers to the cross-assembly direction (i.e., in the +/−Y-direction depicted in FIG. 1), and is transverse to the longitudinal direction. The term "vertical direction" or "up" or "above" refer to the upward-downward direction of the assembly (i.e., in the +/−Z-direction depicted in FIG. 1).

Figure 9:
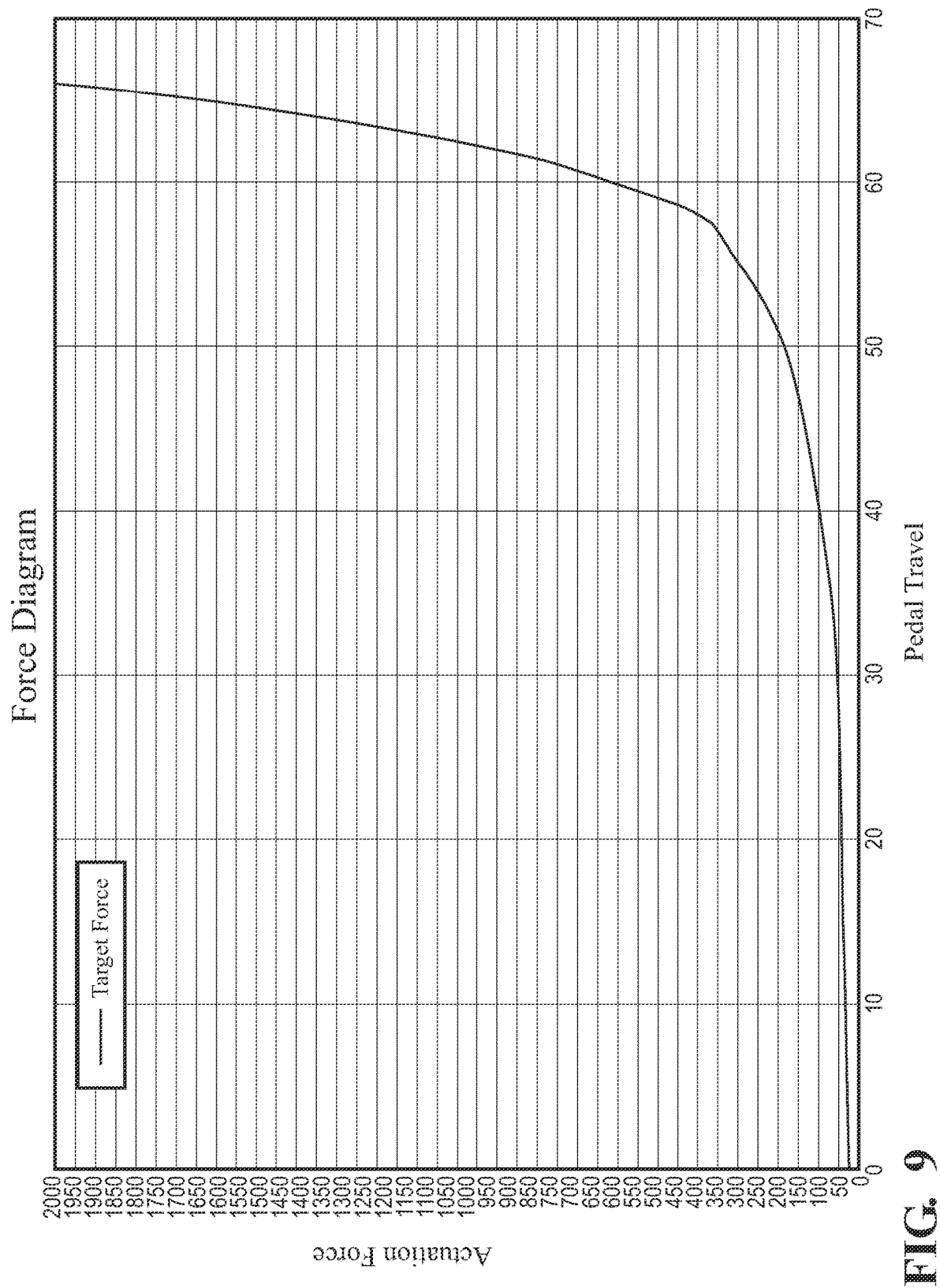
FIG. 9 graphically depicts a desired force response curve for a pedal assembly according to one or more embodiments shown and described herein.

Referring initially to FIG. 9, there is shown a desired force response curve for a pedal assembly, such as an example pedal assembly 10 schematically depicted in FIGS. 1-8. As can be seen, as the pedal travels the greater the apply force that is required. The force is non-linear and increases significantly near the end of the travel of the pedal. This type of force response is typically found in a mechanical pedal design where there is a linkage either mechanically or hydraulically coupled with the brake calipers. As a pedal effort (PE) is applied to the pedal, the pedal arm pivots to allow the pedal to travel. The emulator applies an opposite emulator force (EF) to provide the driver with a resistive force that changes according to the speed in which the PE is applied.

Referring now to FIGS. 1-8, a pedal assembly 10 is schematically depicted. The pedal assembly 10 includes a housing 12, a pedal arm assembly 14, a spring arm member 56, a spring carrier 58, a spring guide assembly 60, a sensor assembly 62, and a bearing guide member 64. The housing 12 includes a pair of sidewalls 26a, 26b, a front wall portion 26c, a rear wall portion 26d, a lower wall portion 26e, an upper wall portion 26f and a top wall portion 26g. The front wall portion 26c is positioned above the rear wall portion 26d in the vertical direction (i.e., in the +/−Z direction). The pair of sidewalls 26a, 26b, the upper wall portion 26f, and the front wall portion 26c define an upper recess 27. The pair of sidewalls 26a, 26b, the rear wall portion 26d, the lower wall portion 26e, and a top wall portion 26g define a lower recess 28. A receiving slot 30 extends between the pair of sidewalls 26a, 26b below the front wall portion and above the lower wall portion 26e in the vertical direction (i.e., in the +/−Z direction).

The lower wall portion 26e includes an indention 39 or void. The indention 39 is positioned below the receiving slot 30 in the vertical direction (i.e., in the +/−Z direction). The indention 39 receives a contact member 42 to position the contact member 42 to make contact with the pedal arm 16 at a predetermined distance of travel of the pedal arm 16, as discussed in greater detail herein.

A protrusion 31 extends within the upper recess 27. The protrusion 31 has a radius portion 32 and a rotation surface portion 34. The radius portion 32 extends from an interior surface 36 of the upper wall portion 26f and an interior surface 38 of the front wall portion 26c in a semi-circular shape within the upper recess 27. That is, the radius portion 32 may extend from interior surface 36 of the upper wall portion 26f in the vertical direction (i.e., in the +/−Z direction) and from the interior surface 38 of the front wall portion 26c in the longitudinal direction (i.e., in the +/−X direction). The rotation surface portion 34 may extend from the interior surface 38 of the front wall portion 26c in the longitudinal direction (i.e., in the +/−X direction) a distance greater than the radius portion 32. The rotation surface portion 34 may be arcuate or curvilinear in shape to correspond to and/or compliment an outer surface 43 of a hub portion 18 of a pedal arm 16, as discussed in greater detail herein.

The bearing guide member 64 may be arcuate to correspond to the shape of the hub portion 18. The bearing guide member 64 includes an inner surface 66a and an opposite outer surface 66b. A recess 68 extends along the arcuate shape of the outer surface 66b to receive the radius portion 32 of the protrusion 31. As such, the bearing guide member 64 may be positioned to abut the interior surface 36 of the upper wall portion 26f and the interior surface 38 of the front wall portion 26c while receiving the radius portion 32 of the protrusion 31 such that the inner surface 66a of the bearing guide member 64 makes contact with the hub portion 18 of the pedal arm 16. That is, the bearing guide member 64 is positioned between the hub portion 18 of the pedal arm 16 and the interior surface 36 of the upper wall portion 26f and the interior surface 38 of the front wall portion 26c of the upper recess 27 of the housing 12.

The pedal arm assembly 14 includes the pedal arm 16, which includes the hub portion 18 at a proximal end 20 and a pedal pad 22 at a distal end 24. The hub portion 18 may include a groove surface 41 extending circumferentially around the hub portion 18. In some embodiments, the proximal end 20 may include a slot 21 extending in the general vertical direction (i.e., in the +/−Z direction) below the groove surface 41 of the hub portion 18 in the vertical direction (i.e., in the +/−Z direction). The slot 21 may receive a portion of the bearing guide member 64 to retain or couple the bearing guide member 64. Further, the slot 21 may receive a portion of the spring arm member 56, as discussed in greater detail herein.

The proximal end 20 may include a bore 19 extending through the pedal arm 16 in the lateral direction (i.e., in the +/−Y direction) and receives a fastener such as a screw, rivet, bolt and nut, and/or the like. The hub portion 18 may be pivotally coupled to the rotation surface portion 34 of the housing 12, as discussed in greater detail herein. As such, the pedal arm 16 pivots, moves, and/or rotates within the housing 12 based on a pressure applied to the pedal pad 22 at the distal end 24 the pedal arm 16.

The pedal arm 16 further includes an extension portion 44 and a contact surface 46. In some embodiments, the extension portion 44, the contact surface 46, and the rear surface 48 may be monolithically formed with the pedal arm 16. In other embodiments, the extension portion 44 may be coupled or attached to the pedal arm 16 via a fastener such as bolt and nuts, screws, rivets, weld, epoxy, adhesive, hook and loop, and the like. The extension portion 44 extends from a rear surface 48 of the pedal arm 16 in in the longitudinal direction (i.e., in the +/−X direction). In some embodiments, the extension portion 44 is formed with two legs 50a, 50b extending from the rear surface 48 to an apex 52. As such, in this embodiment, the extension portion 44 in cross-section may generally be triangular shaped. This is non-limiting and, in other embodiments, the extension portion 44 may be square in shape, rectangular in shape, spherical in shape, octagonal in shape, and/or any other shape, including regular and irregular shapes. The apex 52 may be radiused or arcuate to provide a contact surface 54, as discussed in greater detail herein.

The contact surface 46 of the pedal arm 16 may be a portion of the rear surface 48 of the pedal arm 16 that extends in the longitudinal direction (i.e., in the +/−X direction). As such, the contact surface 46 may be a planar surface. This is non-limiting and the contact surface 46 and/or the rear surface 48 may be curvilinear, arcuate, angled, and/or any other shape. The contact surface 46 of the pedal arm 16 may be positioned below the extension portion 44 in the vertical direction (i.e., in the +/−Z direction). The contact surface 46 and/or the rear surface 48 of the pedal arm 16 makes contact with the contact member 42 at the predetermined distance of travel of the pedal arm 16, as discussed in greater detail herein.

In some embodiments, the rear surface 48 of the pedal arm 16 may further include a downstop 132. The downstop 132 may be positioned below the contact surface 46 in the vertical direction (i.e., in the +/−Z direction). At a predetermined amount of travel of movement of the pedal arm 16, the downstop 132 may make contact with the lower wall portion 26e of the housing 12. In some embodiments, the downstop 132 may make contact and be partially received within the recess 134 of the lower wall portion 26e of the housing 12. As such, the downstop 132 and the lower wall portion 126e of the housing 12 may prevent movement of the pedal arm 16 beyond a predetermined position during a force applied to the pedal pad 22.

The pedal arm 16 is positioned within the receiving slot 30 and pivots, moves, and/or rotates within the receiving slot 30 of the housing 12, as discussed in greater detail herein. The hub portion 18 of the pedal arm 16 is positioned within the upper recess 27 and pivots, moves, and/or rotates against the rotation surface portion 34 within the upper recess 27 of the housing 12, as discussed in greater detail herein.

Still referring to FIGS. 1-8, the spring arm member 56 is coupled to the pair of sidewalls 26a, 26b of the housing 12. The spring arm member 56 includes a pair of walls 70a, 70b, a top wall 70c, and a front wall 70d, defining a cavity portion 72. A hub contact portion 74 may extend from an outer surface 76 of the front wall 70d in the longitudinal direction (i.e., in the +/−X direction). The hub contact portion 74 may be arcuate or curvilinear in shape to correspond to and/or compliment the groove surface 41 of the hub portion 18 of the pedal arm 16 and to be positioned within the slot 21 of the pedal arm 16, as discussed in greater detail herein. As such, in some embodiments, the hub contact portion 74 may extend further in the longitudinal direction (i.e., in the +/−X direction) from the outer surface 76 of the front wall 70d at a lower position than the hub contact portion 74 extends from the outer surface 76 at an upper positon near the top wall 70c in the vertical direction (i.e., in the +/−Z direction). The hub contact portion 74 of the spring arm member 56 is positioned to retain the hub portion 18 of the pedal arm in the housing 12 and to allow the hub portion 18 to rotate, pivot, or otherwise move within the housing about the hub portion 18.

The spring carrier 58 is coupled to the spring arm member 56 at one end and to the extension portion 44 of the pedal arm 16 at the other end. A portion of the spring carrier 58 may be received within the cavity portion 72 and may be coupled to an inner surface 78 of the top wall 70c. In some embodiments, the spring carrier 58 may be coupled to the inner surface 78 of the top wall 70c via a fastener such as a nut and bolt, screw, rivet, hook and loop, adhesive, weld, and/or the like. In other embodiments, the spring carrier 58 may be coupled to the inner surface 78 of the top wall 70c via a press fit configuration with the inner surface 78 of the top wall 70c, which includes a pair of spaced apart ribs or projections that receive a portion of the spring carrier 58 between them in a press fit configuration.

The spring carrier 58 includes a female spring guide 80, an outer spring 82, an inner spring 84, and a male spring guide 86. The inner spring 84 is received within an inner diameter of the outer spring 82, depicted by arrow A1 on FIG. 5. Further, the female spring guide 80 and the male spring guide 86 are coupled to one another within an inner diameter of the inner spring 84, depicted by the arrow A2 in FIG. 5. The outer and inner springs 82, 84, in the assembled state, are coaxially aligned. Each of the outer and inner springs 82, 84 extend between a spring receiving surface 81 of the female spring guide 80 and a spring receiving surface 83 of the male spring guide 86. As such, the outer and inner springs 84, 86 extend between the female spring guide 80 and the male spring guide 86 such that are each are in contact with the spring receiving surface 81 of the female spring guide 80 and a spring receiving surface 83 of the male spring guide 86.

Such an arrangement retains the inner spring 84 and the outer spring 82 while permitting for the inner spring 84 and the outer spring 82 to expand and collapse as a function of the amount of travel of the pedal arm 16, as discussed in greater detail herein. As such, the inner spring 84 and the outer spring 82 may be compression springs with the same or different potential and kinetic energies.

In some embodiments, each of the outer spring 82 and the inner spring 84 may be formed of a steel material. In other embodiments, each of the outer spring 82 and the inner spring 84 may be formed of stainless steel, wire, carbon steel, alloy steel, elgiloy, Monel®, copper, nickel, and/or the like.

A protrusion 88 extends from the female spring guide 80 to act as a coupling point to couple the female spring guide 80 to the top wall 70c of the spring arm member 56, as discussed in greater detail herein. For example, the protrusion 88 may be coupled to the top wall 70c of the spring arm member 56 via a fastener or via a press fit configuration, as discussed in greater detail herein.

A protrusion 90 extends from the male spring guide 86 to act as a coupling point to couple the male spring guide 86 to the extension portion 44 of the pedal arm 16. The protrusion 90 of the male spring guide 86 may be coupled to the extension portion 44 of the pedal arm 16 via a fastener such as a nut and bolt, screw, rivet, hook and loop, adhesive, weld, and/or the like. In other embodiments, the protrusion 90 may be coupled to the extension portion 44 of the pedal arm 16 via a press fit configuration where the leg 50a may include a pair of spaced apart ribs or projections that receive a portion of the protrusion 90 between them in a press fit configuration. In this embodiment, the leg 50a may include a recess portion that the protrusion 90 is recessed within.

In other embodiments, the tension caused by the male spring guide 86 and the female spring guide 80 compressing the inner spring 84 and the outer spring 82 may cause the protrusion 88 to remain in contact with the inner surface 78 of the top wall 72c and to the leg 50a of the extension portion 44 of the pedal arm 16. As such, regardless of the amount of travel of the pedal arm 16, there is a tension caused by the male spring guide 86 and the female spring guide 80 maintaining a position of contact of the spring carrier 58 extending between the extension portion 44 of the pedal arm 16 and the top wall 72c of the spring arm member 56.

When the pedal arm 16 is moved from the home or without force applied position, an elongated member 87 of the male spring guide 86 slidably engages with a receiving bore 89 of the female spring guide 80 to collapse the outer spring 82 and the inner spring 84 and apply the load of the outer spring 82 and inner spring 84 against the leg 50a of the extension portion 44 of the pedal arm 16. As the outer spring 82 and the inner spring 84 compress due to the movement of the pedal arm 16, the spring carrier 58 continues to transfer the load into the pedal arm 16 such that a pedal effort is increased as a function of the amount of travel of the pedal arm 16.

The spring guide assembly 60 includes a spring guide member 92 and a coil spring 94. The coil spring 94 is positioned within the lower recess 28 and portions of the spring guide member 92 are pressed in the longitudinal direction (i.e., in the +/−X direction) into and out of the lower recess 28 based on the amount of travel of the pedal arm 16, as discussed in greater detail herein. As such, the spring guide assembly 60 extends in a longitudinal direction (i.e., in the +/−X direction) and the spring carrier 58 generally extends in the vertical direction (i.e., in the +/−Z direction). As such, the spring guide assembly 60 extends and moves in a perpendicular direction compared to the spring carrier 58 that extends and moves in the vertical direction (i.e., in the +/−Z direction).

The spring guide member includes a cam surface 96a and an opposite rear surface 96b. The coil spring 94 is positioned between, and makes contact with, the rear surface 96b of the spring guide member 92 and an inner surface 98 of the rear wall portion 26d of the lower recess 28. The coil spring 94 may have a smaller overall length than the inner spring 84 and the outer spring 82.

In some embodiments, the coil spring 94 may be formed of a steel material. In other embodiments, the coil spring 94 may be formed of stainless steel, wire, carbon steel, alloy steel, elgiloy, Monel®, copper, nickel, and/or the like.

The spring guide member 92 may include a pair of arms 100a, 100b that each include an angled surface 102a, 102b. The pair of arms 100a, 100b may be resilient members to permit for a snap fit or cantilever fit into a respective slot 104a, 104b of the top wall portion 26g and lower wall 28g of the housing 12 that define the lower recess 28.

The cam surface 96a may be planar or may be recessed within the spring guide member 92. Moreover, the cam surface 96a may include different segments with different shapes or angles. As such, one segment may be arcuate with a constant radius while other segments may be curvilinear with or without uniform radii. It should be appreciated that the shape of the cam surface 96a changes a force characteristic when the contact surface 54 of the apex 52 slidably engages with different portions of the cam surface 96a as a function of the amount of travel of the pedal arm 16.

That is, the cam surface 96a and the coil spring 94 together apply more or less force onto the extension portion 44 of the pedal arm 16 so that depending on the amount of pressure of the pedal pad 22, the force output pedal effort felt by the user changes, as discussed in greater detail herein. That is, the contact surface 54 of the apex 52 of the extension portion 44 may move along the cam surface 96a in response to the amount of pressure applied to the pedal pad 22, which also compresses the coil spring 94 against the inner surface 98 of the rear wall portion 26d within the lower recess 28.

The housing 12, the pedal arm 16, the spring arm member 56, the spring guide assembly 60, the bearing guide member 64, the female spring guide 80, and/or the male spring guide 86 may be a molded plastic. For example, the housing 12, the pedal arm 16, the spring arm member 56, the spring guide assembly 60, the bearing guide member 64, the female spring guide 80, and/or the male spring guide 86 may be may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, thermoplastic vulcanizate, polysulfone, combinations thereof, and/or the like. Additionally, additives may be added such as UV absorbers, flame-retardants, colorants, glass fibers, plasticizers and/or the like.

In some embodiments, the housing 12, the pedal arm 16, the spring arm member 56, the spring guide assembly 60, the bearing guide member 64, the female spring guide 80, and/or the male spring guide 86 may be formed from injection molding. In other embodiments, the housing 12, the pedal arm 16, the spring arm member 56, the spring guide assembly 60, the bearing guide member 64, the female spring guide 80, and/or the male spring guide 86 may be may be formed from additive manufacturing techniques. Additive manufacturing techniques refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

The contact member 42 may have an engagement surface 106 that makes contact or slidably engages with the contact surface 46 and/or the rear surface 48 of the pedal arm 16. The engagement surface 106 may have a plurality of spaced apart recesses 108 extending through the engagement surface 106 in the vertical direction (i.e., on the +/−Z direction). The contact member 42 may be configured to slidably engage and/or compresses upon contact with the contact surface 46 and/or the rear surface 48 such that an additional pedal effort force is generated and felt by the user, as discussed in greater detail herein.

The contact member 42 may be an elastomer material such as a cured silicone rubber that may be applied as a liquid via a one-shot injection molding or other known methods to form any shape desired. In other embodiments, the contact member 42 may be a silicone rubber, natural rubber, or other elastomeric material that is formed using compression and other techniques and that is suitable for repetitive compression over millions of cycles and has temperature performance desired in pedal assembly applications. The plurality of spaced apart recesses 108 may affect the compression characteristic of the contact member 42 when contact is made with the contact surface 46 and/or the rear surface 48 of the pedal arm 16.

Figure 11:
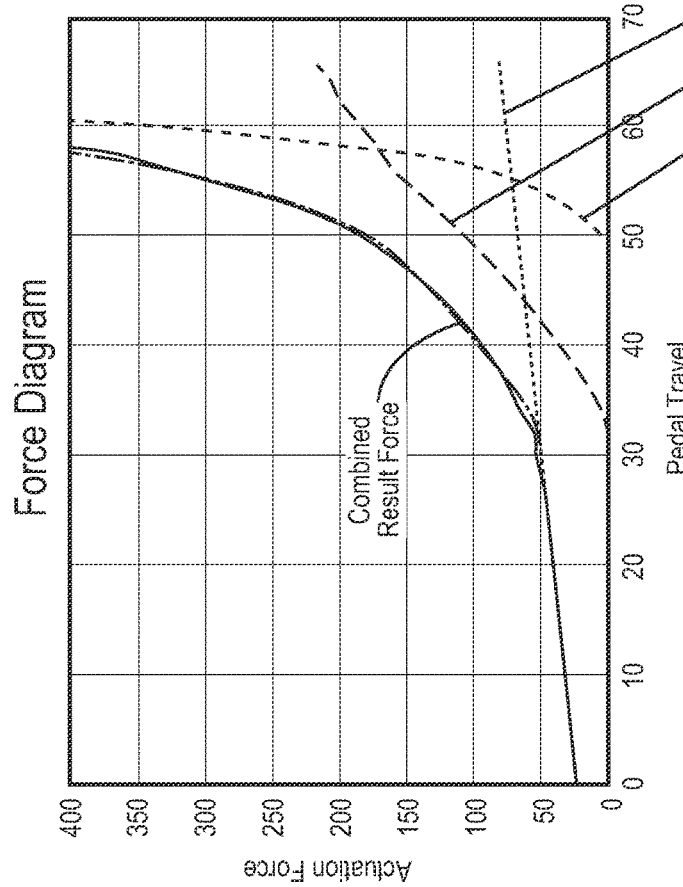
FIG. 11 graphically depicts independent output force response curves for pedal effect force generating components of the pedal assembly of FIG. 1 according to one or more embodiments shown and described herein.

In some embodiments, the elastomer material of the contact member 42 may have a stiffness characteristic of at least 100 newton-millimeters (N/mm) spring rate in an uncompressed state, or starting state. In some embodiments illustrated herein, the contact member 42 may have a stiffness characteristic of at least 150 newton-millimeters (N/mm) spring rate in an uncompressed state, or starting state. As the contact member 42 is compressed and/or slidably engaged from the pressure applied by the contact surface 46 and/or the rear surface 48 of the pedal arm 16, the stiffness characteristic of the contact member 42 sharply increases until a fully compressed state, as best illustrated in FIG. 11, and disclosed in greater detail herein.

The housing 12 may be a hanging assembly that is mounted to a dash of a vehicle such as to an instrument panel, a firewall and/or the like. As such, portions of the rear wall portion 26d and/or the top wall portion 26g may be coupled, mounted or otherwise attached to a component of the vehicle to hold the pedal pad 22 and the distal end 24 of the pedal arm 16 off a vehicle floor in a vertical direction (i.e., in the +/−Z direction).

The sensor assembly 62 detects movement of the hub portion 18 of the pedal arm 16 via an inductive sensing assembly 110 and a Hall Effect sensing assembly 112. In the inductive sensing assembly 110, a coupler 114 is positioned in a coupler carrier 116 that may extend within and between a pair of openings 118 of the housing 12 and through the bore 19 of the hub portion 18. As such, the coupler carrier 116 may include an elongated member 120 with a distal end 122 that also includes a magnet 124, for use with the Hall Effect sensing assembly 112, as discussed in greater detail herein.

Figure 5:
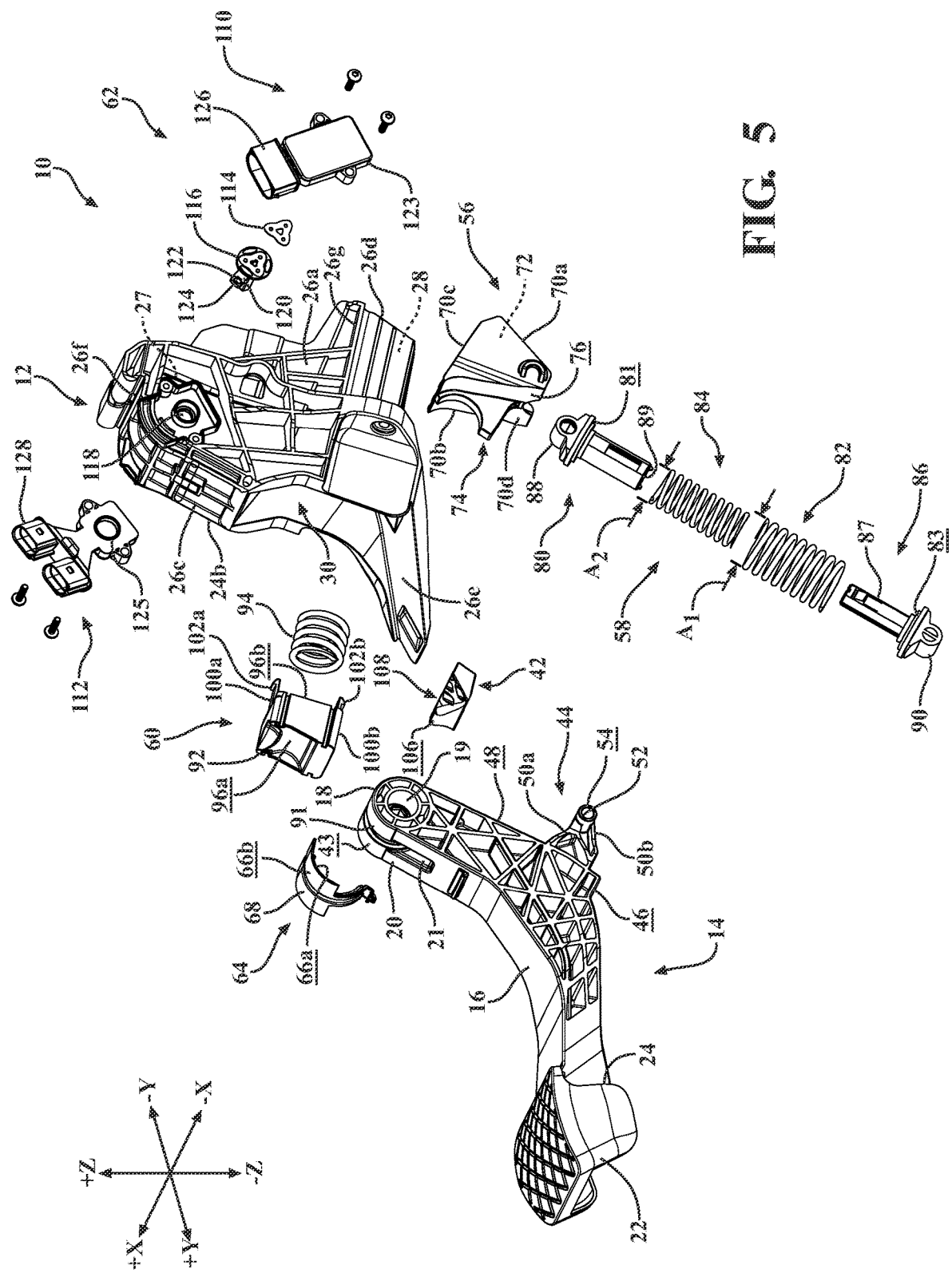
FIG. 5 schematically depicts an exploded perspective view of the electronic throttle pedal assembly of FIG. 1 according to one or more embodiments shown and described herein.
Figure 6:
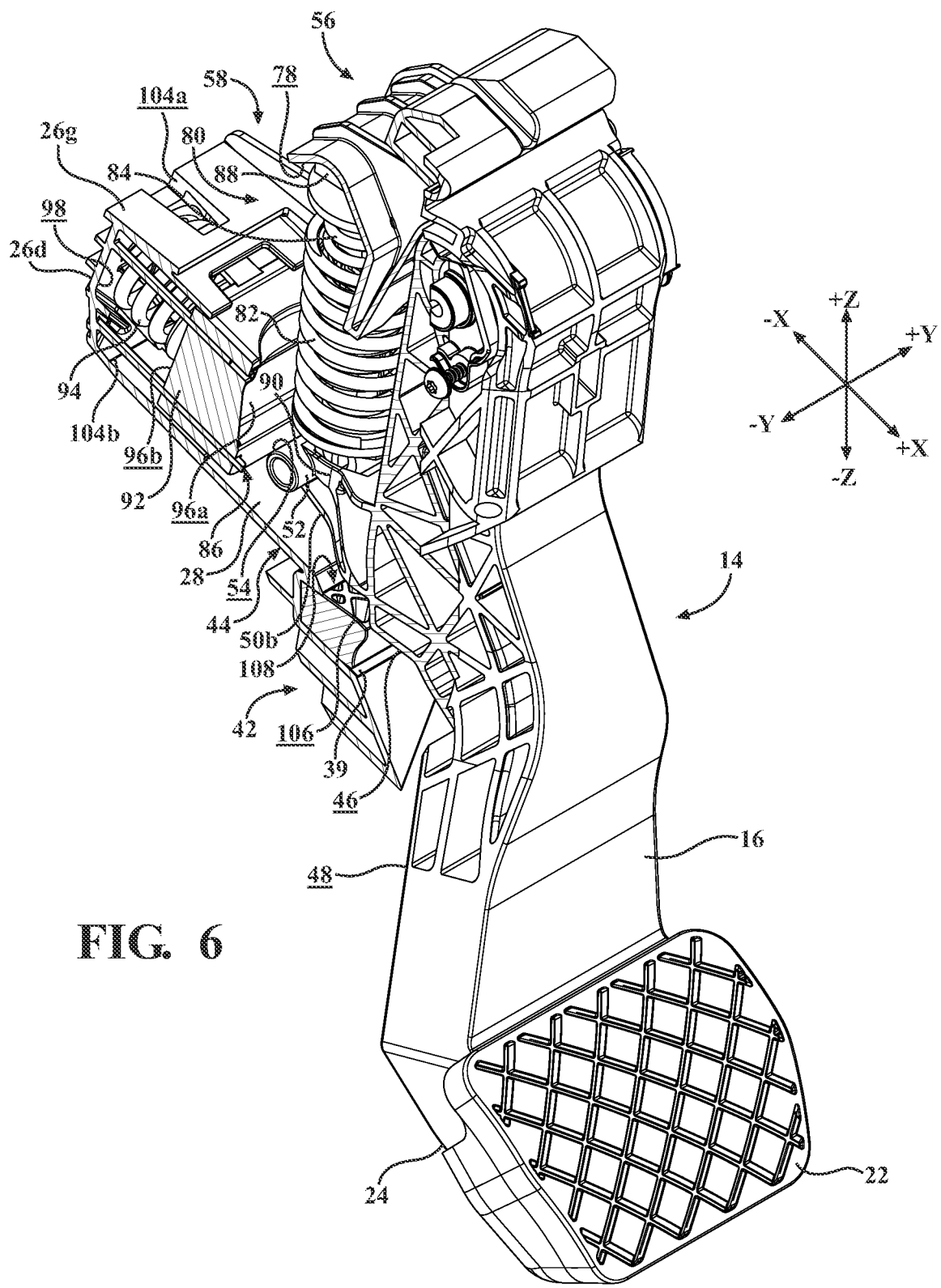
FIG. 6 schematically depicts a partial perspective and cross-sectional view of the pedal assembly of FIG. 1 taken from line 1-1 without a housing and in a undepressed state according to one or more embodiments shown and described herein.
Figure 7:
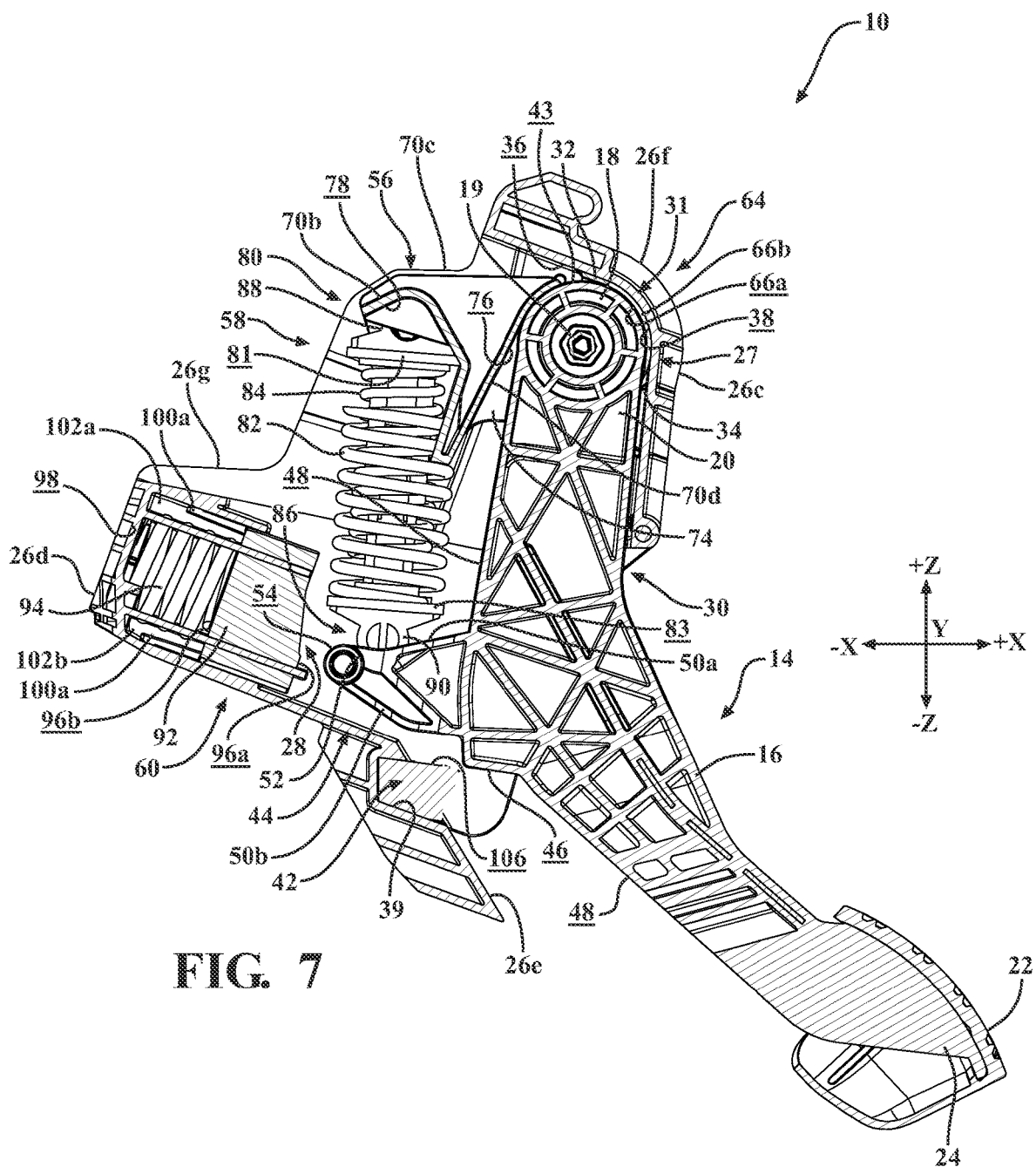
FIG. 7 schematically depicts a side cross-sectional view of the pedal assembly of FIG. 1 taken from line 1-1 with a pedal arm in an undepressed state according to one or more embodiments shown and described herein.
Figure 8:
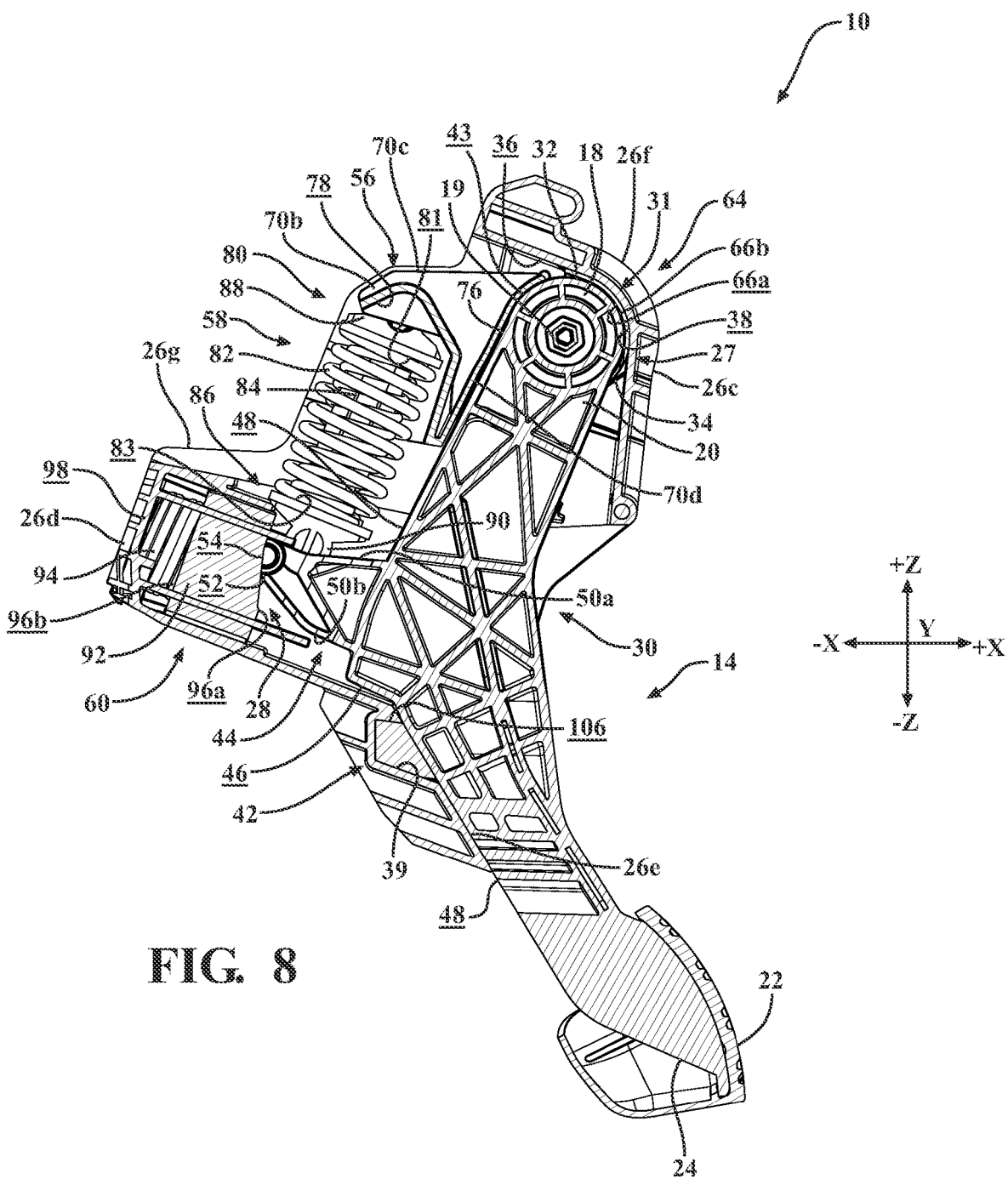
FIG. 8 schematically depicts a side cross-sectional view of the pedal assembly of FIG. 1 taken from line 1-1 with the pedal arm in a fully depressed state according to one or more embodiments shown and described herein.

In some embodiments, the inductive sensing assembly 110 includes a printed wiring assembly 123 and a connector housing 126. The printed wiring assembly 123 may include a circuit board (or a printed circuit board), which may include at least one receiver coil, a transmitter coil, and a plurality of terminal pins extending therefrom. The coupler 114 may be mounted or attached to the coupler carrier 116 in the vicinity of and perpendicular to the pivot axis at the hub portion 18. The coupler 114 may be positioned adjacent to the at least one receiver coil. In some embodiments, the coupler 114 may include distinct lobes, such as three lobes as illustrated in FIG. 5. This is non-limiting and the coupler 114 may have more or less lobes, be circular, or other shapes, such as a half-moon, square, rectangular, and/or the like. The coupler 114 may rotate or pivot upon movement of the pedal pad 22 of the pedal arm 16.

The at least one receiver coil and the transmitter coil detect the movements of the coupler 114 and that data is transmitted to an electronic control unit and/or powertrain controller communicatively coupled to the inductive sensing assembly 110 via the plurality of terminal pins extending within the connector housing 126. Portions of the inductive sensing assembly 110 may include overmold to encapsulate the electronic components, and it may include solderless connections between the printed wiring assembly and plurality of terminal pins, such as compliant through-hole pins.

The Hall Effect sensing assembly 112 detects movement of the magnet 124 using Hall Effect technology. In some embodiments, the Hall Effect sensing assembly 112 includes a printed wiring assembly 125 and a connector housing 128. The printed wiring assembly 125 may include a circuit board, which may include at least one Hall Effect chip and a plurality of terminal pins 130 extending therefrom. The at least one Hall effect chip is sensitive to a Hall effect detection of magnetic change, and to convert a displacement or angular measurement of a coupler, such as the magnet 124, to an electronic or electromagnetic signal. This information is transmitted through the plurality of terminal pins positioned within the connector housing 128 and to the electronic control unit and/or the powertrain controller for processing. The connector housing 128 may be a dual connector housing, as illustrated in FIG. 5, a single connector housing, or have more than two connector housings.

The magnet 124 may be mounted or attached to the sidewall 26b, opposite to the side of the inductive sensing assembly 110, at the pivot point of the hub portion 18 in the vicinity of and perpendicular to the pivot axis. As such, the magnet 124 may be positioned adjacent to the at least one Hall Effect chip. In some embodiments, the magnet 124 may be generally circular. In other embodiments, the magnet 124 may be a plurality of other shapes, such as rectangular, square, hexagonal, octagonal, and/or the like. The magnet 124 may rotate or pivot upon movement of the pedal pad 22 of the pedal arm 16.

The at least one Hall effect chip detects the movements of the magnet 124 and that data is transmitted to the electronic control unit and/or powertrain controller communicatively coupled to the Hall effect sensing assembly 112 via the plurality of terminal pins extending within the connector housing 128. Portions of the Hall Effect sensing assembly 112 may include overmold to encapsulate the electronic components, and it may include solderless connections between the printed wiring assembly 125 and the plurality of terminal pins 130, such as compliant through-hole pins.

It should be understood that the inductive sensing assembly 110 and the Hall Effect sensing assembly 112 simultaneously measure the movement of the hub portion 18 of the pedal arm 16 such that redundant sensing may occur. Further, the redundant sensing described herein uses different sensing techniques, which provide for a more robust redundant sensing compared to conventional systems.

In operation, when the pedal arm 16 is moved between a plurality of depressed positions, the hub portion 18 rotates or pivots within the housing 12 and against or slidably engages with the bearing guide member 64 and the spring arm member 56 such that the pedal arm 16 pivots or rotates, which in turn compresses the inner spring 84 and the outer spring 82 of the spring carrier 58 during a first predetermined travel amount of the pedal arm 16. Such rotation within or against the bearing guide member 64 and the spring arm member 56 and the compression of the inner spring 84 and the outer spring 82 causes or generates a first pedal effort force onto the pedal arm 16.

When the pedal arm 16 pivots or rotates to the second predetermined amount of travel, the contact surface 54 of the apex 52 of the extension portion 44 of the pedal arm engages with the cam surface 96a of the spring guide member 92 and the rear surface 96b compresses the coil spring 94 into the rear wall portion 26d of the lower recess 28. Such movement causes or generates a second pedal effort force onto the pedal arm 16. The second pedal effort force is a greater pedal effort force felt by the user than the first pedal effort force, as discussed in greater detail herein.

When the pedal arm 16 pivots or rotates to the third predetermined amount of travel, the contact surface 46 and/or the rear surface 48 of the pedal arm 16 makes contact and slidably engages with the contact member 42, which in turn causes slideable engagement with and/or compression of the contact member 42. The contact member 42 causes or generates a third pedal effort force onto the pedal arm 16. The third pedal effort force is a greater pedal effort force felt by the user than that of the first pedal effort force and the second pedal effort force, as discussed in greater detail herein.

Figure 10:
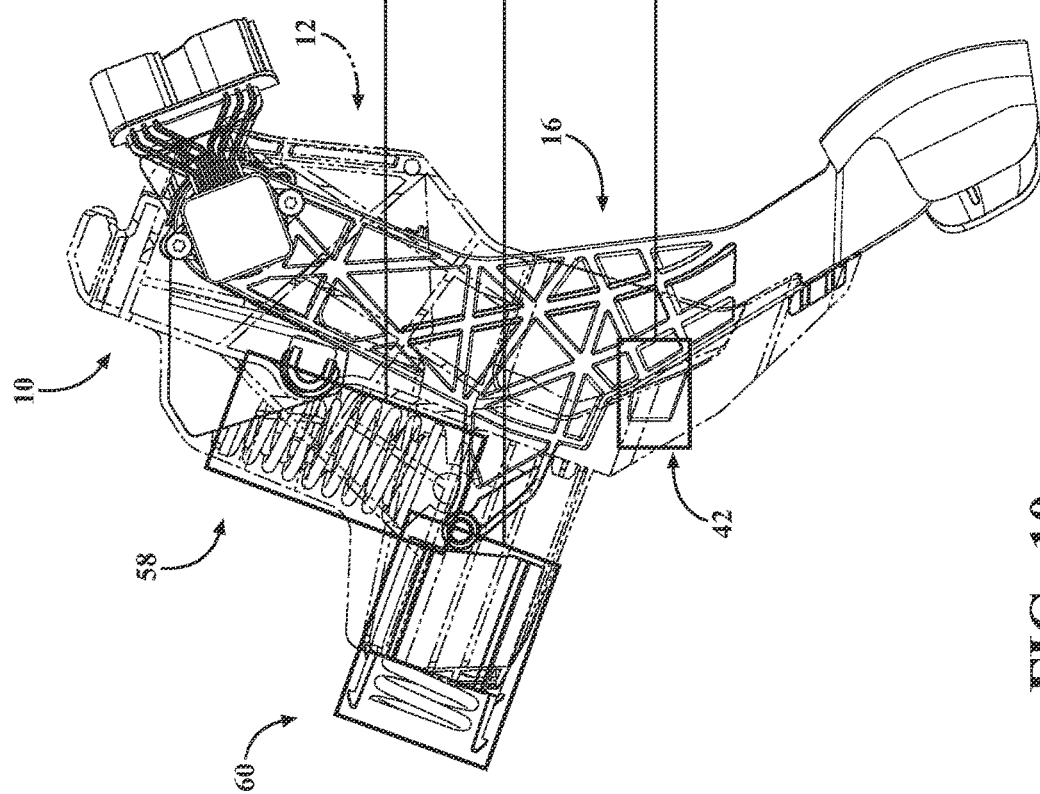
FIG. 10 graphically depicts an output force response curve for the pedal assembly of FIG. 1 according to one or more embodiments shown and described herein.

Now referring to FIGS. 10 and 11, an example graphical illustration of the various pedal effort force generated onto the pedal arm 16 as a function of an amount of travel of the pedal arm 16 is schematically depicted. It should be understood that the forces and travel amounts for of the pedal arm 16 is for illustrative purposes only and is not limiting to the amount of forces or travel distances depicted in FIG. 10. As illustrated from the 0-millimeter (mm) position until the fully depressed position (illustrated as 66 mm), the inner spring 84 and/or the outer spring 82 of the spring carrier 58 are always applying a force to the pedal arm 16.

As the pedal arm 16 moves or travels, the force increases due to the tension in the spring carrier 58 acting on the spring arm member 56 as well as the friction caused from the hub portion 18 rotating against the hub contact portion 74 of the spring arm member 56 and the bearing guide member 64. As such, the pedal effort generated by the tension in the spring carrier 58 acting on the spring arm member 56 as well as the friction caused from the hub portion 18 rotating against the hub contact portion 74 of the spring arm member 56 and the bearing guide member 64 is generally linear as a function of the amount of travel distance of the pedal arm 16.

When the pedal arm 16 travels approximately 34 mm, the contact surface 54 of the extension member 40 of the pedal arm 16 makes contact with the cam surface 96a of the spring guide member 92 of the spring guide assembly 60. Upon contact, the coil spring 94 begins to compresses and the various segments of the cam surface 96a provide or generate the second pedal effort. As illustrated, the second pedal effort is in addition to the first pedal effort such that the user feels an increased pedal effort on the pedal pad 22 that is a combination or total of the first pedal effort in addition to the second pedal effort.

As illustrated, the spring guide assembly 60 applies the second pedal effort as a function of the amount of travel of the pedal arm 16 from the 34 mm position through the fully depressed position (illustrated as 66 mm). The pedal effort generated by the tension in the coil spring 94 and the cam surface 96a is generally linear as a function of the amount of travel distance of the pedal arm 16 with a steeper angle of increase than that of the pedal effort generated by the tension in the spring carrier 58 acting on the spring arm member 56 as well as the friction caused from the hub portion 18 rotating against the hub contact portion 74 of the spring arm member 56 and the bearing guide member 64.

When the pedal arm 16 travels approximately 50 mm, the contact surface 46 of the pedal arm 16 makes contact with the contact member 42. Upon contact, the contact member 42 slidably engages with the contact surface 46 and/or compresses to provide or generate the third pedal effort. As illustrated, the third pedal effort is in addition to the first pedal effort and the second pedal effort such that the user feels an increased pedal effort on the pedal pad 22 that is a summation or total of the first pedal effort, the second pedal effort and now the third pedal effort. The force characteristic curve generated by contact of the contact surface 46 against the contact member 42 is a sharply increasing curve extending in a nearly vertical direction as a function of the amount of travel distance of the pedal arm 16.

It should now be understood that the pedal assembly described herein includes three different components, each configured to provide a different pedal effort force to a pedal arm as a function of travel of the pedal arm. For example, the pedal assembly includes a spring carrier coupled to the pedal arm, a spring guide assembly, and a contact member. Each provide a different pedal effort onto the pedal arm depending on the amount of travel of the pedal arm and the summation of the pedal effort forces apply at the fully travel position of the pedal arm.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A pedal assembly comprising:
    a housing;
    a spring arm member coupled to the housing;
    a pedal arm having a hub portion and an opposite pedal pad, the hub portion is pivotally retained in the housing by the spring arm member at the hub portion, an extension portion extending from a rear surface of the pedal arm, the extension portion having a radiussed portion;
    a spring carrier coupled to the pedal arm and to the spring arm member, the spring carrier having at least one spring positioned to provide a first pedal effort force to the pedal arm at a first amount of predetermined travel of the pedal arm; and
    a spring guide member having a contact surface and an opposite rear surface that contacts a second at least one spring positioned between the rear surface and the housing, the contact surface receives contact from the pedal arm when the pedal arm exceeds a second amount of predetermined travel of the pedal arm, the second at least one spring provides a second pedal effort force,
    wherein the radiussed portion of the extension portion is spaced apart from the contact surface of the spring guide member when the pedal pad is in the first amount of predetermined travel of the pedal arm and contacts the contact surface of the spring guide member when the pedal pad is moved to the second amount of predetermined travel of the pedal arm, and
    wherein when the pedal pad is depressed to the first amount of predetermined travel of the pedal arm, the at least one spring of the spring carrier applies the first pedal effort force onto the pedal arm and when the pedal pad is further depressed to the second amount of predetermined travel of the pedal arm, the contact surface and the second at least one spring applies the second pedal effort force onto the pedal arm, the second pedal effort force is a greater pedal effort than the first pedal effort force.

2. The pedal assembly of claim 1, wherein the first pedal effort force increases as the pedal pad travels through the first amount of predetermined travel of the pedal arm.

3. The pedal assembly of claim 1, wherein the second pedal effort force increases as the pedal pad travels through the second amount of predetermined travel of the pedal arm.

4. The pedal assembly of claim 1, wherein the spring guide member extends in a direction that is angled with respect to the spring carrier.

5. The pedal assembly of claim 1, wherein the contact surface of the spring guide member is a cam surface positioned to be in contact with the pedal arm.

6. The pedal assembly of claim 1, further comprising:
    a contact member coupled to the housing, the contact member makes contact with the pedal arm to provide a third pedal effort force at a third amount of predetermined travel of the pedal arm.

7. The pedal assembly of claim 6, wherein when the pedal pad is depressed to the third amount of predetermined travel of the pedal arm, the contact member applies the third pedal effort force onto the pedal arm, the third pedal effort force is a greater pedal effort than the second pedal effort force.

8. The pedal assembly of claim 6, wherein the contact member is positioned in the housing below the spring carrier and the spring guide member in a vertical direction.

9. The pedal assembly of claim 8, wherein the contact member makes contact with the rear surface of the pedal arm below the extension portion extending from the rear surface of the pedal arm in the vertical direction.

10. The pedal assembly of claim 1, further comprising:
    a sensor assembly having:
        a coupler rotatably mounted to one side of the hub portion, and
        an inductive sensor assembly configured to detect movement of the coupler.

11. The pedal assembly of claim 10, wherein the sensor assembly further comprising:
a magnet mounted to the other one side of the hub portion,
a Hall Effect sensor assembly configured to detect movement of the magnet.

12. A pedal assembly for a vehicle, the pedal assembly comprising:
a housing;
a spring arm member coupled to the housing;
a pedal arm having a hub portion and an opposite pedal pad, the hub portion is movably coupled to the housing by the spring arm member at the hub portion;
a spring carrier coupled to the pedal arm and to the spring arm member, the spring carrier having at least one spring positioned to provide a first pedal effort force to the pedal arm at a first amount of predetermined travel of the pedal arm; and
a spring guide assembly having a spring guide member and a second at least one spring extending in an angled direction with respect to the spring carrier, the spring guide member having a cam surface and an opposite rear surface, the second at least one spring positioned between the rear surface and the housing, the second at least one spring provides a second pedal effort force at a second amount of predetermined travel of the pedal arm, the cam surface is spaced apart from the pedal arm when the pedal arm is at the first amount of predetermined travel of the pedal arm and when the pedal arm is at the second amount of predetermined travel of the pedal arm, the cam surface is in contact with the pedal arm,
wherein when the pedal pad is depressed to the first amount of predetermined travel of the pedal arm, the at least one spring of the spring carrier applies the first pedal effort force onto the pedal arm and when the pedal pad is further depressed to the second amount of predetermined travel of the pedal arm, the cam surface and the second at least one spring applies the second pedal effort force onto the pedal arm, the second pedal effort force is a greater pedal effort than the first pedal effort force.

13. The pedal assembly of claim 12, wherein the first pedal effort force increases as the pedal pad travels through the first amount of predetermined travel of the pedal arm.

14. The pedal assembly of claim 13, wherein the second pedal effort force increases as the pedal pad travels through the second amount of predetermined travel of the pedal arm.

15. The pedal assembly of claim 12, further comprising:
a contact member coupled to a void of the housing, the contact member makes contact with the pedal arm to provide a third pedal effort force at a third amount of predetermined travel of the pedal arm.

16. The pedal assembly of claim 15, wherein when the pedal pad is depressed to the third amount of predetermined travel of the pedal arm, the contact member applies the third pedal effort force onto the pedal arm, the third pedal effort force is a greater pedal effort than the second pedal effort force.

17. The pedal assembly of claim 16, wherein the contact member is positioned in the housing below the spring carrier and the spring guide member in a vertical direction.

18. The pedal assembly of claim 12, further comprising:
a sensor assembly having:
a coupler rotatably mounted to one side of the hub portion,
an inductive sensor assembly configured to detect movement of the coupler,
a magnet mounted to the other one side of the hub portion, and
a Hall Effect sensor assembly configured to detect movement of the magnet.

19. A pedal assembly comprising:
a housing;
a spring arm member coupled to the housing;
a pedal arm having a hub portion and an opposite pedal pad, the hub portion is pivotally retained in the housing by the spring arm member at the hub portion;
a spring carrier coupled to the pedal arm and to the spring arm member, the spring carrier having at least one spring positioned to provide a first pedal effort force to the pedal arm at a first amount of predetermined travel of the pedal arm; and
a spring guide member having a contact surface and an opposite rear surface that contacts a second at least one spring positioned between the rear surface and the housing, the spring guide member and the second at least one spring extends in an angled direction with respect to the spring carrier, the contact surface is spaced apart from the pedal arm when the pedal arm is at the first amount of predetermined travel of the pedal arm and the contact surface receives contact from the pedal arm when the pedal arm is at a second amount of predetermined travel of the pedal arm, the at least one spring provides a second pedal effort force,
a contact member coupled to the housing, the contact member makes contact with the pedal arm to provide a third pedal effort force when the pedal arm is at a third amount of predetermined travel of the pedal arm,
wherein when the pedal pad is depressed to the first amount of predetermined travel of the pedal arm, the at least one spring of the spring carrier applies the first pedal effort force onto the pedal arm and when the pedal pad is further depressed to the second amount of predetermined travel of the pedal arm, the contact surface of the spring guide member and the second at least one spring applies the second pedal effort force onto the pedal arm, the second pedal effort force is a greater pedal effort than the first pedal effort force, and the contact member applies the third pedal effort force onto the pedal arm, the third pedal effort force is a greater pedal effort than the second pedal effort force.

20. The pedal assembly of claim 19, further comprising:
a sensor assembly having:
a coupler rotatably mounted to one side of the hub portion,
an inductive sensor assembly configured to detect movement of the coupler,
a magnet mounted to the other one side of the hub portion, and
a Hall Effect sensor assembly configured to detect movement of the magnet.

* * * * *